(12) United States Patent
Zhou et al.

(10) Patent No.: US 8,955,549 B2
(45) Date of Patent: Feb. 17, 2015

(54) WATERWAY SWITCH DEVICE

(75) Inventors: Huasong Zhou, Xiamen (CN); Yonghua Chen, Xiamen (CN); Hui Huang, Xiamen (CN); Dongying Cheng, Xiamen (CN)

(73) Assignees: Xiamen Solex High-Tech Industries Co., Ltd., Xiamen, P.R. (CN); Huasong Zhou, Xiamen, P.R. (CN)

( * ) Notice: Subject to any disclaimer, the term of this patent is extended or adjusted under 35 U.S.C. 154(b) by 0 days.

(21) Appl. No.: 13/994,049

(22) PCT Filed: Dec. 21, 2011

(86) PCT No.: PCT/CN2011/084338
§ 371 (c)(1),
(2), (4) Date: Jun. 13, 2013

(87) PCT Pub. No.: WO2012/083847
PCT Pub. Date: Jun. 28, 2012

(65) Prior Publication Data
US 2013/0263950 A1 Oct. 10, 2013

(30) Foreign Application Priority Data

Dec. 23, 2010 (CN) .......................... 2010 1 0604212
Apr. 7, 2011 (CN) .......................... 2011 1 0086806

(51) Int. Cl.
*F16K 31/46* (2006.01)
*B05B 1/16* (2006.01)
*B05B 1/18* (2006.01)
*E03C 1/02* (2006.01)
(Continued)

(52) U.S. Cl.
CPC ............. *F16K 31/465* (2013.01); *B05B 1/1663* (2013.01); *B05B 1/18* (2013.01); *E03C 1/023* (2013.01); *E03C 1/0408* (2013.01); *F16K 11/0445* (2013.01)
USPC ........................ 137/625.48; 137/872; 251/294

(58) Field of Classification Search
CPC .................................................. F16K 11/0445
USPC .............................. 137/625.48, 872; 251/294
See application file for complete search history.

(56) References Cited

U.S. PATENT DOCUMENTS 1,566,273 A * 12/1925 Gade .......................... 137/625.5
1,666,531 A * 4/1928 Glauber ........................... 4/570
(Continued)

FOREIGN PATENT DOCUMENTS

CN 2511395 Y 9/2002
CN 201143473 Y 11/2008
(Continued)

*Primary Examiner* — John Rivell
*Assistant Examiner* — Christopher Ballman
(74) *Attorney, Agent, or Firm* — Rabin & Berdo, P.C.

(57) ABSTRACT

A waterway switch device has a waterway mechanism, an execution part, an operation part and a transmission part. The waterway mechanism has a main body, and an inlet and a plurality of outlets are arranged on the main body. The execution part is mounted in the main body and has a moving piece, and at least the switch of the outlets to the inlet can be achieved through the relative movement between the moving piece and the main body. The operation part has a handle. The transmission part has a wire rope, one end of the wire rope is connected with the moving piece, the other end is connected with the handle in a transmission manner. The handle rotates relatively, and the wire rope is driven to move, and the moving piece can move relative to the main body.

12 Claims, 16 Drawing Sheets

(51) Int. Cl.
   *E03C 1/04*      (2006.01)
   *F16K 11/044*    (2006.01)

(56) References Cited

U.S. PATENT DOCUMENTS

| | | | |
|---|---|---|---|
| 2,274,787 A * | 3/1942 | Groen | 137/312 |
| 3,717,142 A * | 2/1973 | Mickelson | 601/157 |
| 4,427,177 A * | 1/1984 | Constantinescu et al. | 251/230 |
| 6,036,110 A * | 3/2000 | Kanatzar et al. | 239/317 |
| 6,306,110 B1 * | 10/2001 | McElhannon | 601/160 |
| 6,859,955 B2 * | 3/2005 | Hudson | 4/601 |
| 2008/0295241 A1 * | 12/2008 | Zhadanov et al. | 4/614 |
| 2009/0000022 A1 * | 1/2009 | Phipps et al. | 4/601 |
| 2011/0265890 A1 * | 11/2011 | Killian | 137/468 |
| 2012/0266992 A1 * | 10/2012 | Zhou et al. | 137/861 |

FOREIGN PATENT DOCUMENTS

| | | |
|---|---|---|
| CN | 101347770 A | 1/2009 |
| CN | 101862711 A | 10/2010 |

* cited by examiner

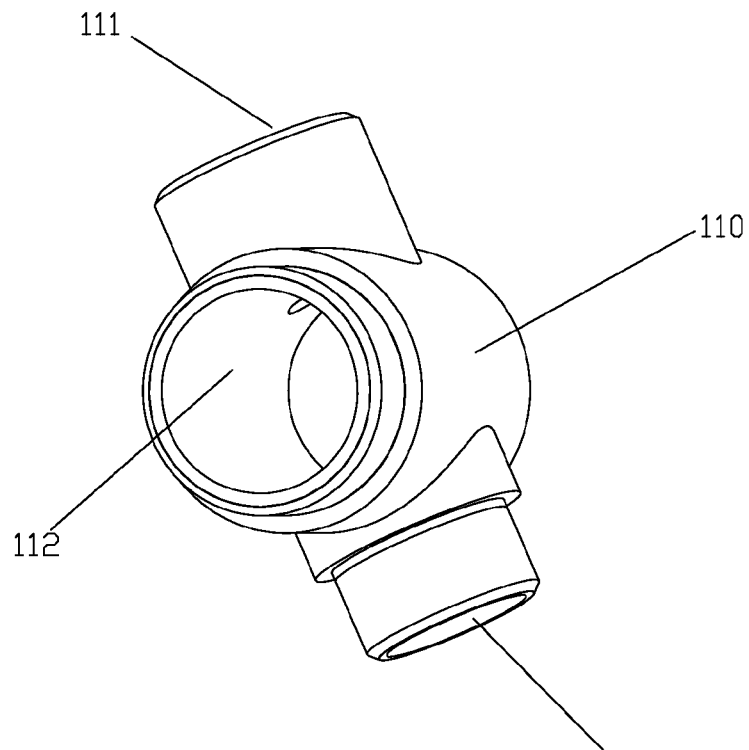
FIG. 13
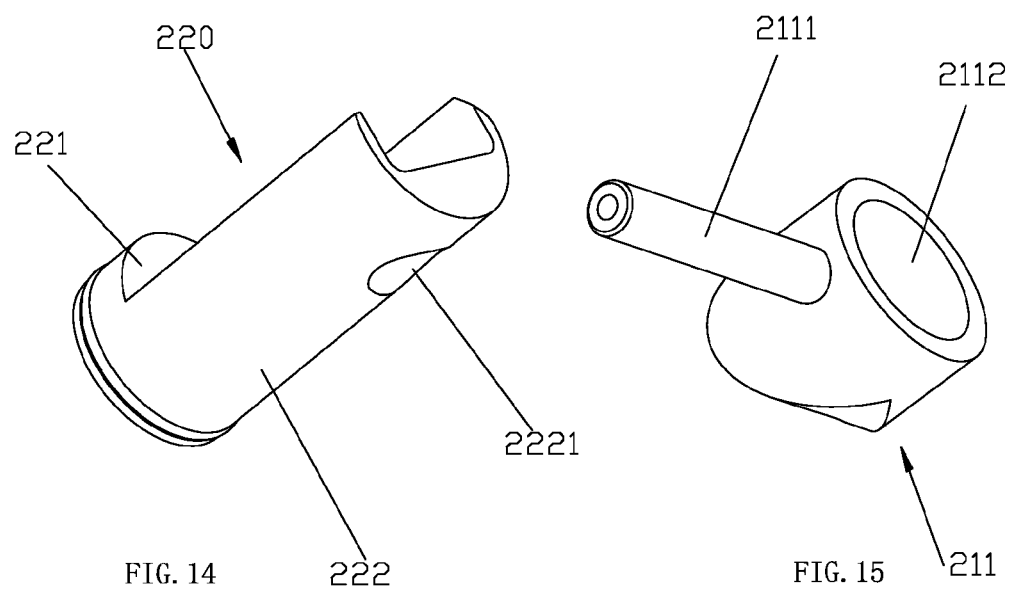
FIG. 14
FIG. 15

WATERWAY SWITCH DEVICE

FIELD OF THE INVENTION

The present invention relates to a waterway switch device.

BACKGROUND OF THE INVENTION

The traditional waterway switch device comprises a main body. The main body is provided with an inlet and two outlets. A switch mechanism is arranged in the main body, such as sliding switch mechanism or rotary switch mechanism, for switching the two outlets to communicate with the inlet. Because the switch mechanism comprises a moving piece, the switch is achieved through the relative movement between the moving piece and the main body. Because the users usually do the switch through the moving piece of the socket directly, the switch is inconvenient, especially when the main body is arranged at high position.

SUMMARY OF THE INVENTION

The object of the present invention is to offer a waterway switch device which overcomes the defects of the waterway device at the prior art.

The technical proposal solving the technical matter in the present invention is:

Waterway switch device, comprises:

A waterway mechanism (100), comprises a main body (110), and an inlet (111) and a plurality of outlets (112, 113) are arranged on the main body (110);

An execution part (200), is mounted in the main body (110) and comprises a moving piece (210), and at least the switch of the outlets (112, 113) to the inlet (111) can be achieved through the relative movement between the moving piece (210) and the main body (110);

An operation part (300), comprises a handle (310) that can rotate relatively; and A transmission part (400), comprises a wire rope (410), one end of the wire rope (410) is connected with the moving piece (210), the other end is connected with the handle (310) in a transmission manner, wherein, the handle (310) can rotate relatively, and the wire rope (410) can move relative to the waterway mechanism (100), and the moving piece (210) can move relative to the main body (110).

In a preferred embodiment, the waterway mechanism (100) also comprises a lifting pipe (120), and the lifting pipe (120) is fixed to the main body (110); the operation part (300) is mounted to the lifting pipe (120), and the handle (310) can rotate relative to the lifting pipe (120); at least part of the wire rope (410) is in the lifting pipe (120).

In a preferred embodiment, the main body (110) comprises a three-way valve, and the lifting pipe (120) is fixed to the three-way valve and communicated with the outlet (112).

In a preferred embodiment, the transmission part (400) also comprises a coat (420), and the coat (420) is mounted in the lifting pipe (120), and the two ports of the coat (420) are hermetically connected with the operation part (300) and the execution part (400) respectively, and the coat (420) is passed through by the wire rope (410).

In a preferred embodiment, the main body (110) comprises a cantilever (130) and a shower (140) communicated with the cantilever (130) is fixed to the main body (110), the lifting pipe (120) is fixed to the cantilever (130), and the outlets (112, 113) is arranged to the shower (140), and the execution part (200) is arranged to the shower (140), and the outlet of the shower (140) can be switched through the handle (310), and the outlet functions are switched.

In a preferred embodiment, the transmission part (400) also comprises a coat (420), and the coat (420) is mounted in the lifting pipe (120), and two ports of the coat (420) are connected with the operation part (300) and the cantilever (130) respectively, and the other end of the wire rope (410) passes through the coat (420) and then passes into the cantilever (130) hermetically, and then is connected with the execution part (200).

In a preferred embodiment, the operation part (300) is mounted to the main body (110), and the handle (310) can rotate relative to the main body (110); and the wire rope (410) is in the main body (110).

In a preferred embodiment, the operation part (300) also comprises an operation seat (320), a rotation seat (330) and a connector (340), the operation seat (320) is mounted to the port of the lifting pipe (120), and the rotation seat (330) can be mounted in the sliding seat (320) in a rotating manner and provided with an eccentric guiding slot (331), and the connecting piece (340) is connected with the operation seat (320) in a sliding manner and with the wire rope (410), and the handle (310) is connected with the operation seat (320) in a rotating manner and with the rotation seat (330) synchronously and coaxially in a rotating manner, and a pin (341) is fixed to the connecting piece (340), and the pin (341) is connected with the guiding slot (331) in a coupling manner.

In a preferred embodiment, a plurality of locating grooves (351) is concavely arranged out of the operation seat (320), and an against spring (352) is connected with the handle (310), and the end of the against spring (352) is connected with a locating pin (353), and the locating pin (353) is spliced into one of the locating grooves in a coupling manner.

In a preferred embodiment, the operation part (300) also comprises an operation seat (320), a rotation seat (330) and a connector (340), the operation seat (320) is mounted to the port of the lifting pipe (120) and is provided with a lower waterway (321) communicated with the lifting pipe (120), and the rotation seat (330) can be mounted in the sliding seat (320) in a rotating manner and provided with an eccentric guiding slot (331), and the connecting piece (340) is connected with the operation seat (320) in a sliding manner and with the wire rope (410), and the handle (310) is connected with the operation seat (320) in a rotating manner and with the rotation seat (330) synchronously and coaxially in a rotating manner, and a pin (341) is fixed to the connecting piece (340), and the pin (341) is connected with the guiding slot (331) in a coupling manner.

Another preferred embodiment is described below, it comprises

A waterway mechanism (100), comprises a main body (100), and an inlet (111) and a plurality of outlets (112, 113) are arranged on the main body (110);

An execution part (200), is mounted in the main body (110) and comprises a moving piece (210), and at least the switch of the outlets (112, 113) to the inlet (111) can be achieved through the relative movement between the moving piece (210) and the main body (110);

An operation part (700), comprises a push-pull rod (710) that can slide relatively; and A transmission part (400), comprises a wire rope (410), one end of the wire rope (410) is connected with the moving piece (210), the other end is connected with the push-pull rod (710) in a transmission manner, wherein, the push-pull rod (710) can slide relatively, and the wire rope (410) can move relative to the waterway mechanism (100), and the moving piece (210) can move relative to the main body (110).

Another preferred embodiment is described below, it comprises

A waterway mechanism (100), comprises a main body (100), and an inlet (111) and a plurality of outlets (112, 113) are arranged on the main body (110);

An execution part (200), is mounted in the main body (110) and comprises a moving piece (210), and at least the switch of the outlets (112, 113) to the inlet (111) can be achieved through the relative movement between the moving piece (210) and the main body (110);

An operation part (800), comprises a push button (810) that can slide relatively; and A transmission part (400), comprises a wire rope (410), one end of the wire rope (410) is connected with the moving piece (210), the other end is connected with the push button (810) in a transmission manner, wherein, the push button (810) can slide relatively, and the wire rope (410) can move relative to the waterway mechanism (100), and the moving piece (210) can move relative to the main body (110).

Compared with the technical proposal at the prior, the benefits of the present invention are:

1 the handle can rotate relatively or the push button (push-pull rod) can slide relatively, and then the wire rope is driven to move, and then the moving piece is driven to move relative to the main body, and then the waterway switch is achieved, and the defects of the prior are overcomes, and the following effects are present: a, the execution part is arranged on the main body, and the handle or the push button (push-pull rod) of the operation part can be arranged on the main body, or other positions besides the main body, for example the lower end of the lifting pipe, the operation part can be arranged at a convenient position, no matter where the main body is arranged, the users can always operate handily; b, the execution pan and the operation part can be transmitted through the wire rope, the users do not need to operate the moving piece directly, and then it is easy for designing the seal structure;

2 the shape and the length of the lifting pipe are not limited; and the wire rope can be arranged in the lifting pipe, and the appearance is not affected, and it is easy for designing the seal structure;

3 the lifting pipe is fixed to the three-way valve and communicated with the outlets, so that no internal pipe is needed in the lifting pipe with low cost;

4 the coat is arranged in the lifting pipe, and the wire rope passes through the coat, and then an inhaul cable is generated, and it avoids the direct contacting between the wire rope and the lifting pipe, and then the damage that wire rope to the lifting pipe;

5 the sliding switch mechanism is used in the execution part with simple structure and it is easy for designing the seal structure;

6 the operation part comprises an operation seat, a rotation seat and a connector with simple structure and easy operation;

7 the main body comprises a cantilever and a shower communicated with the cantilever and fixed to the main body, the switch of the outlet functions of the shower can be controlled through the handle of the operation part, and the operation is fast and convenient.

BRIEF DESCRIPTION OF THE DRAWINGS

With the following description of the drawings and specific embodiments, the invention shall be further described in details.

FIG. 13 shows the solid abridged general view of the main body in the embodiment 1;

FIG. 14 shows the solid abridged general view of the water division body in the embodiment 1;

FIG. 15 shows the solid abridged general view of the sliding body in the embodiment 1;

DESCRIPTION OF THE PREFERRED EMBODIMENTS

Embodiment 1

Figure 1:
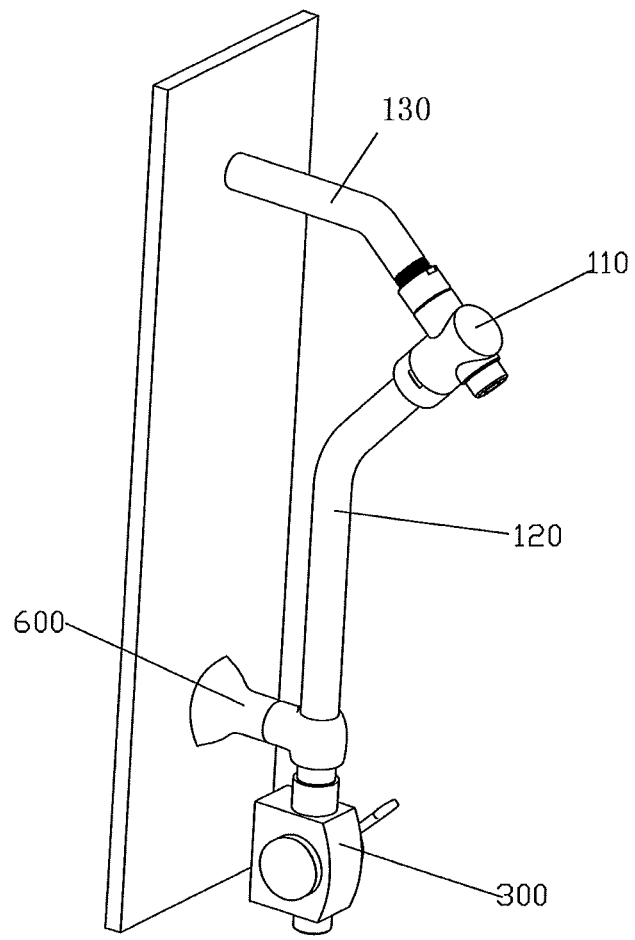
FIG. 1 shows the first solid abridged general view of the waterway device in the embodiment 1.
Figure 2:
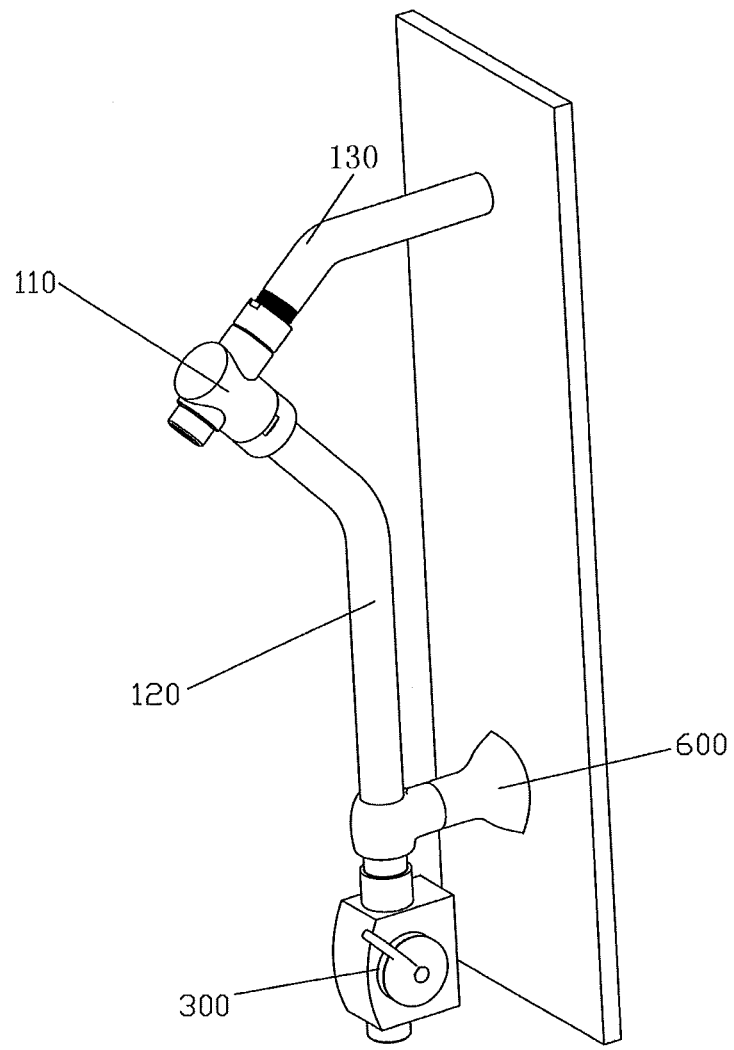
FIG. 2 shows the second solid abridged general view of the waterway device in the embodiment 1.
Figure 3:
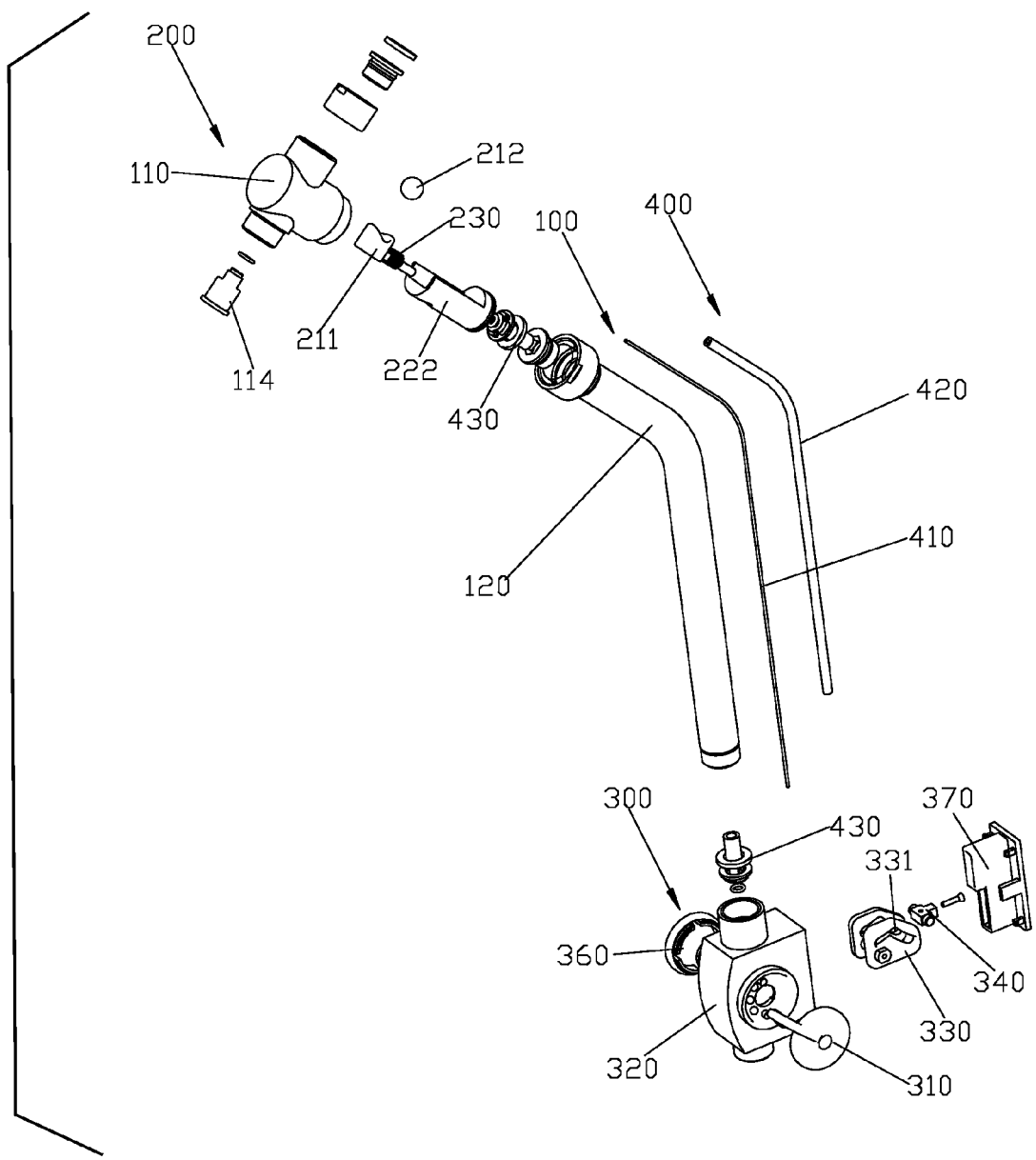
FIG. 3 shows the first solid exploded view of the waterway device in the embodiment 1.
Figure 4:
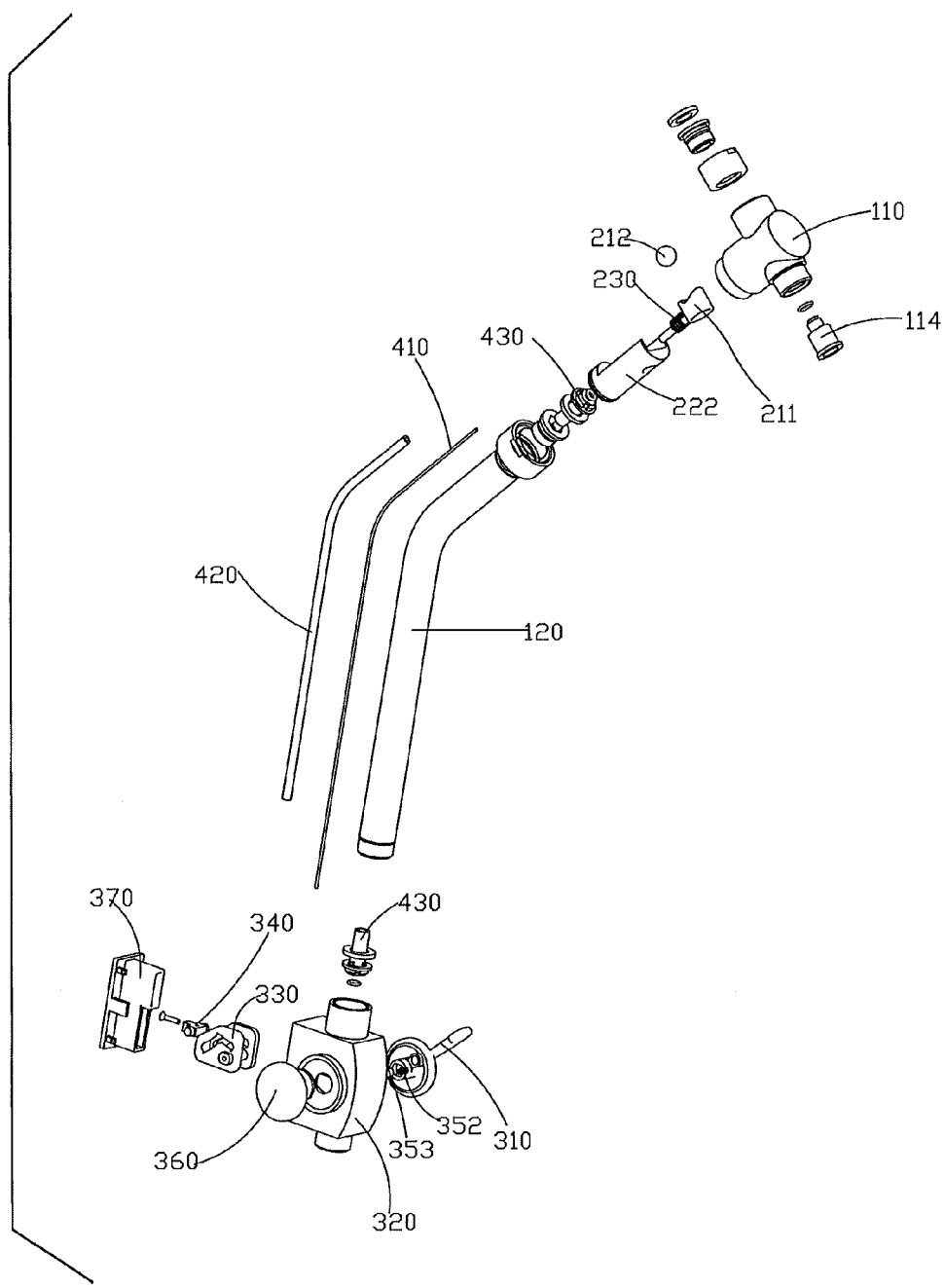
FIG. 4 shows the second solid exploded view of the waterway device in the embodiment 1.
Figure 5:
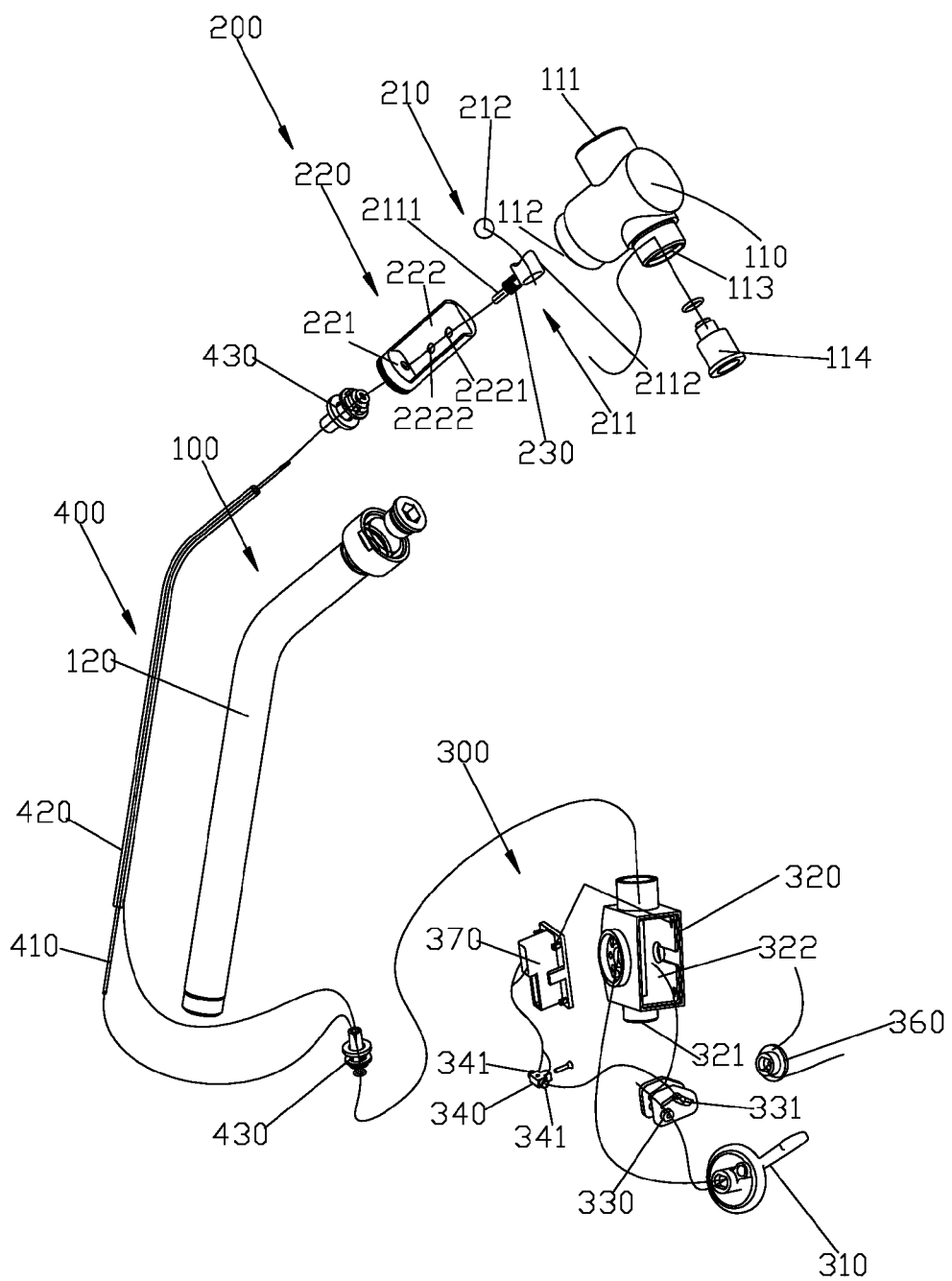
FIG. 5 shows the third solid exploded view of the waterway device in the embodiment 1.
Figure 6:
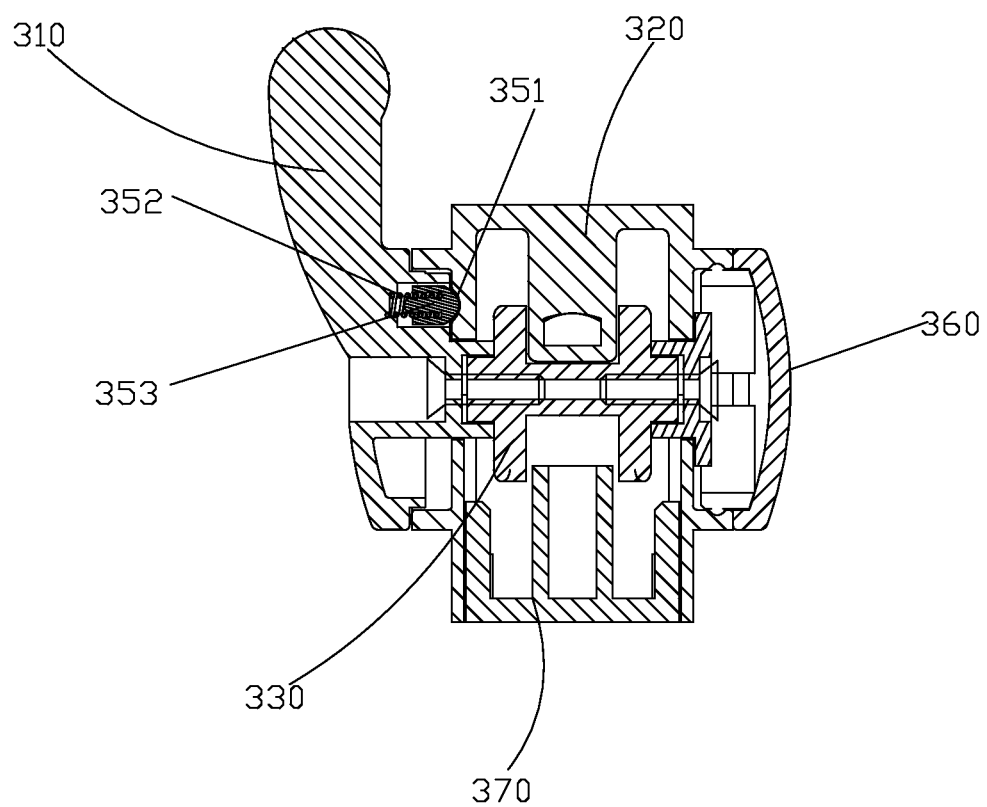
FIG. 6 shows the sectional view of the operation part of the water device in the embodiment 1.

According to FIG. 1 to 19, the waterway switch device comprises a waterway mechanism 100, an execution part 200, an operation part 300 and a transmission part 400.

The waterway mechanism 100 comprises a main body 110 and a lifting pipe 120, the main body 110 comprises a three-way valve, and an inlet 111 and two outlets 112, 113 are arranged on the three-way valve, and the lifting pipe 120 is fixed to the main body 110 and communicated with the outlet 112, and a draining mouth 114 is connected to the outlet 113. In the present embodiment, the inlet 111 of the main body 110 is communicated with cantilever 50. And the lifting pipe 120 is steadily fixed through an adsorption mechanism 600.

The execution part 200 is mounted in the main body 110 and comprises a moving piece 210 and a water division body 220.

The water division body 220 comprises a bottom wall 211 and a cambered wall 222 fixed on the bottom wall 221, and the bottom wall 221 is fixed to the first port of the lifting pipe 120 hermetically, and the cambered wall 222 is fixed in the main body 110 hermetically with two axially arranged branch waterways 2221 and 2222, of which the opening is ahead the inlet 111. The branch waterway 2221 is communicated with the outlet 113; the branch waterway 2222 is communicated with the outlet 112 and comprises an inlet port on the internal cambered surface of the cambered wall 222 and an outlet port on the side of the bottom surface of the bottom wall 221 and communicated with the lifting pipe 120.

The moving piece 210 comprises a sliding piece 211 and a seal ball 212, the sliding piece 211 comprises a sliding rod 2111 and a assembling seat 2112 fixed on the sliding rod 2111, and the seal ball 212 is mounted in the assembling seat 2112 in a moving manner, and the bottom wall 221 is penetrated by the sliding rod 2111 in a sliding manner.

Figure 7:
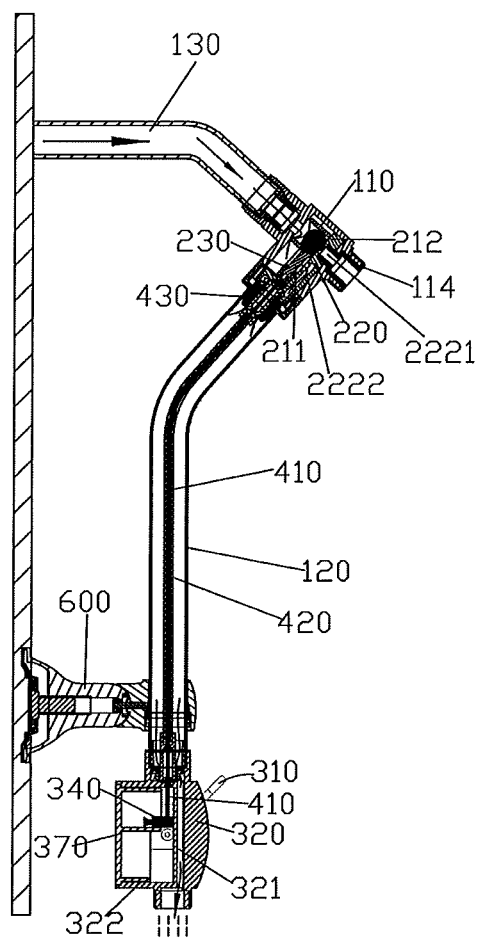
FIG. 7 shows the first sectional view of the water device in the embodiment 1, water comes out of the lifting pipe at this moment.
Figure 8:
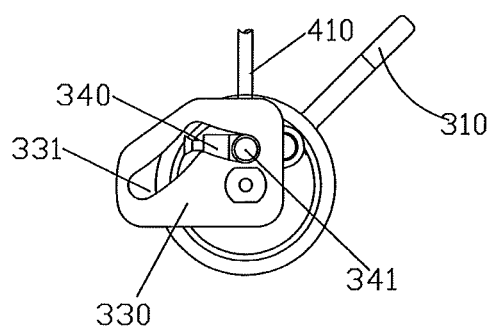
FIG. 8 shows the first abridged general view of the operation part of the water device in the embodiment 1, water comes out of the lifting pipe at this moment.
Figure 9:
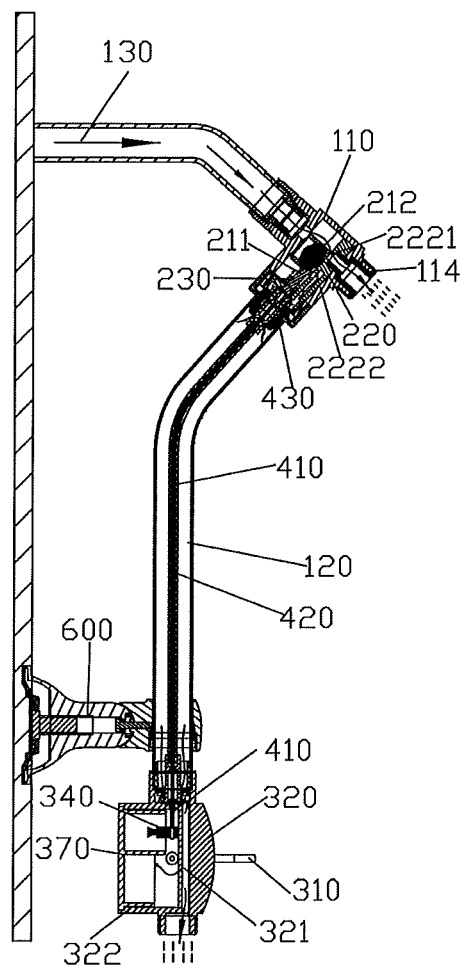
FIG. 9 shows the second sectional view of the water device in the embodiment 1, water comes out of both the lifting pipe and another outlet of the main body simultaneously at this moment.
Figure 10:
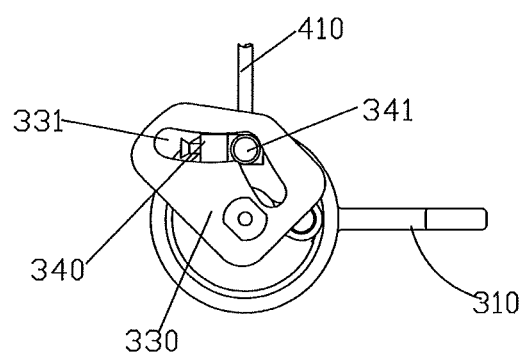
FIG. 10 shows the second abridged general view of the operation part of the water device in the embodiment 1, water comes out of both the lifting pipe and another outlet of the main body simultaneously at this moment.
Figure 11:
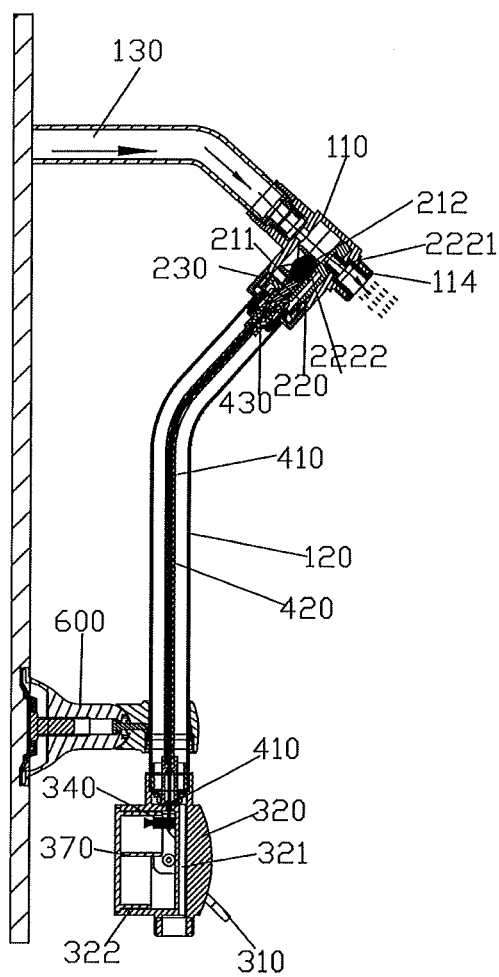
FIG. 11 shows the first sectional view of the water device in the embodiment 1, water comes out of another outlet of the main body e at this moment.
Figure 12:
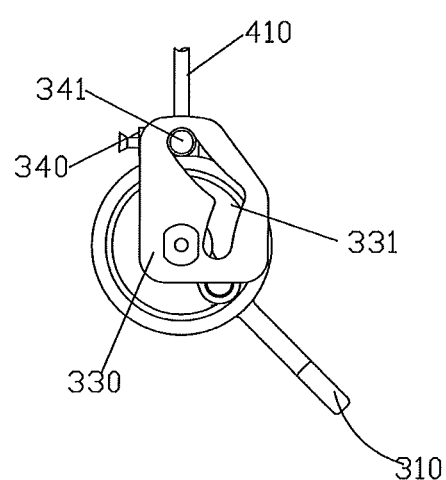
FIG. 12 shows the first abridged general view of the operation part of the water device in the embodiment 1, water comes out of another outlet of the main body at this moment.
Figure 16:
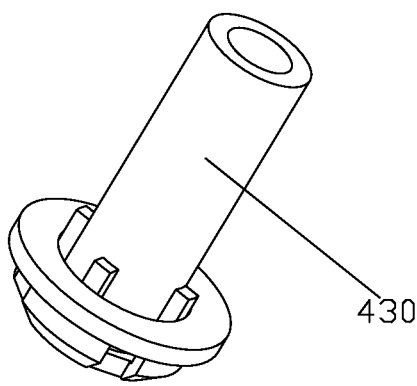
FIG. 16 shows the solid abridged general view of the support piece in the embodiment 1.
Figure 17:
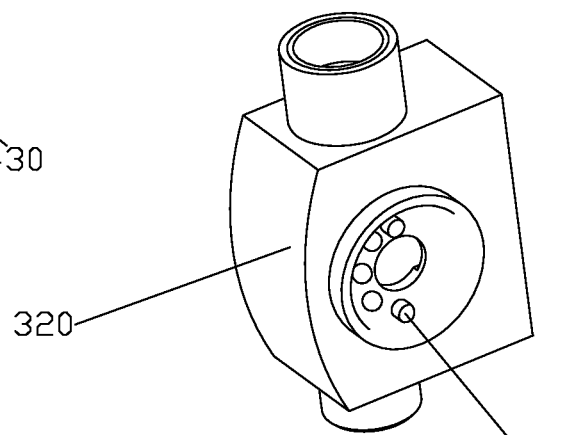
FIG. 17 shows the first solid abridged general view of the operation body in the embodiment 1.
Figure 18:
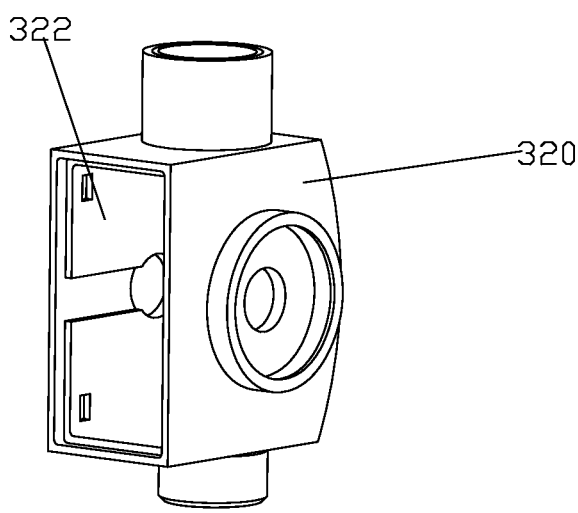
FIG. 18 shows the second solid abridged general view of the operation body in the embodiment 1.
Figure 19:
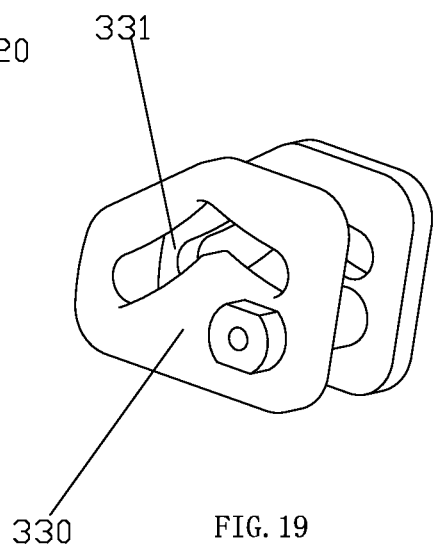
FIG. 19 shows the solid abridged general view of the rotation seat in the embodiment 1.
Figures 20, 21:
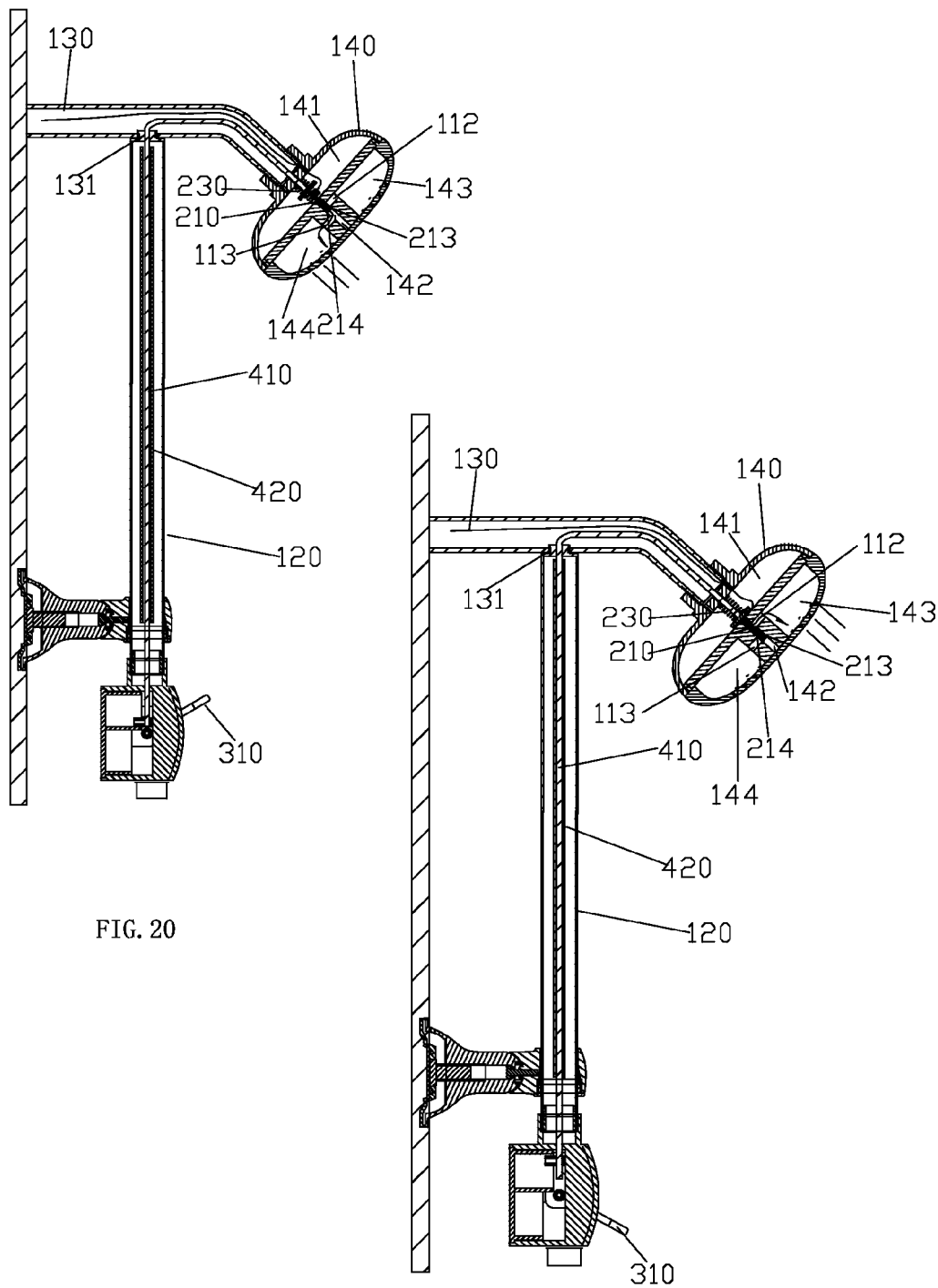
FIG. 20 shows the first sectional view of the waterway device in the embodiment 2, water comes out of one outlet at this moment.
FIG. 21 shows the second sectional view of the waterway device in the embodiment 2, water comes out of two outlets at this moment.

Wherein, the seal ball 212 is driven to move through the sliding of the sliding piece 211 relative to the water division body 220, and the branch waterways can be sealed by the seal ball 212 under the action of water pressure, so that at least the two outlets 112, 113 can be switched to be communicated with the inlet 111, and then water can come out of the lifting pipe as shown in FIGS. 7 and 8, or water can come out of the lifting pipe and another outlet simultaneously as shown in FIGS. 9 and 20, or water can comes out of another outlet as shown in FIGS. 11 and 12. In the present embodiment, the sliding coupling seal ball is used for switching, but it is not limited, a rotary switch method can be used as needed.

The operation part 300 is mounted to the lifting pipe 120 and comprises a handle 310 that can rotate relative to the lifting pipe 120, and operation seat 320, a rotation seat 330 and a connecting piece 340. The operation seat 320 is mounted at the second port of the lifting pipe 120 and is provided with a lower waterway 321 communicated with the lifting pipe 120, and an assembly groove 322 is opened in the operation seat 320. The rotation seat 330 can be mounted in the assembly groove 322 of the operation seat 320 and is provided with an eccentric guiding slot 331. The connecting piece 340 is connected to the operation seat 320 in a sliding manner, and a pin 341 is fixed to the connecting piece 340, and the pin 341 is connected to the guiding slot 331 in a coupling manner, and the handle 310 is connected out of the operation seat 320 in a rotating manner and with the rotating seat synchronously and coaxially. Therefore, when the handle 310 is rotated relative to the operation seat 320, the rotating seat 330 is driven to rotate, and then the eccentric guiding slot 331 is driven to rotate, and then the connecting piece 340 is driven to slide up and down relative to the operation seat 320. For easy assembling, a side cover 360 is connected to the other side of the operation seat, and a back cover 370 is connected under the operation seat.

The transmission part 400 comprises a wire rope 410 in the lifting pipe 120 and a coat 420. The first end of the wire rope 410 is connected with the connecting piece 340, and the second end is connected with the sliding piece 211, so that the sliding piece 211 can be driven to slide relative to the main body 110 through the wire rope 410 when the sliding piece 340 is sliding relative to the operation seat 320. In the present embodiment, the end of the wire rope 410 extends into the connecting slot opened on the connecting piece 340, and then the connecting piece is locked tight through screw, and the wire rope 410 is clamped tight by the screw, and then the locking connection is achieved.

For ensuring that the execution part 200 can execute accurately and circularly, it is better that a return spring 230 is arranged to the execution part 200. So that the switch can be achieved through connecting the wire rope in a pulling manner and the return spring 230 is compressed when the operation part 300 is moving forward, and the return spring returns and the wire rope 410 is pulled tight when the operation 300 is moving backward; a locating mechanism is arranged on the operation part 300 for avoiding that the operation part moves backward under the action of the return spring after the hand is loosen.

In the present embodiment, the return spring 230 is sleeved to the sliding rod 2111 and is against between the bottom wall 221 and the assembling seat 2112.

In the present embodiment, the arrangement of the locating mechanism is: a plurality of locating grooves 351 are concavely arranged out of the operation seat 320, and the handle 310 is connected with an against spring 352, and the end of the against spring 352 is connected with a locating pin 353, and the locating pin 353 is spliced in one of the locating grooves 351.

The coat 420 is mounted in the lifting pipe 120, and the two ports of the coat 420 are both fixed to a support piece 430, and the wire rope 410 passes through the coat 420 and the support pieces 430, and the two support pieces 430 are connected with the water division body 220 of the execution part 200 and the operation seat 320 of the operation part 300 respectively.

Figure 22:
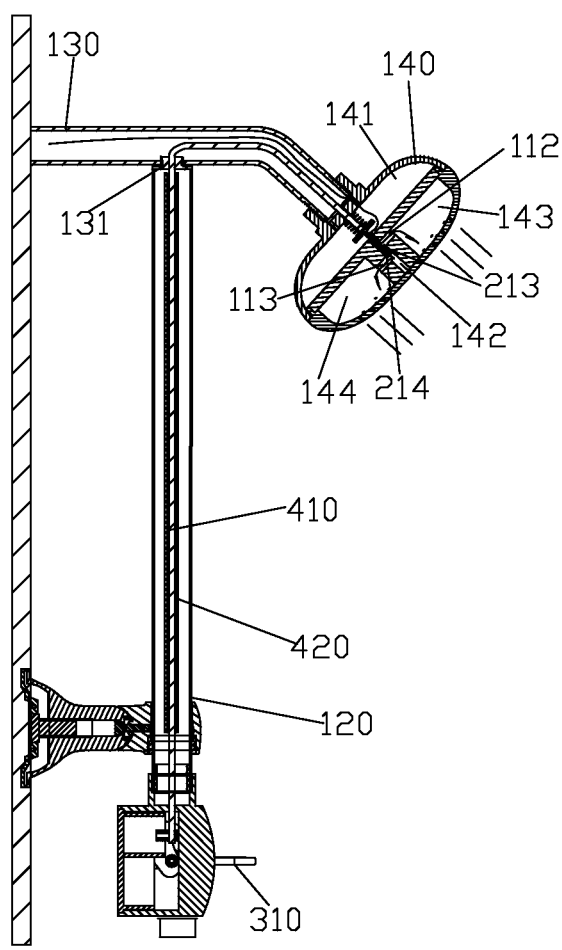
FIG. 22 shows the third sectional view of the waterway device in the embodiment 2, water comes out of another outlet at this moment.

Embodiment 2, the differences from the embodiment 1 are:

According to FIGS. 20, 21 and 22, the main body 110 comprises a cantilever 130 and a head shower 140 that is fixed to and communicated with the cantilever 130, a connecting hole 131 penetrating from inside to outside is arranged to the cantilever 130; and the lifting pipe 120 is fixed to the cantilever 130 and corresponding to the connecting hole 131.

The coat 420 is mounted in the lifting pipe 120, and one port of the coat 420 is connected with the operation part 300, another port is connected with the connecting hole 131 of the cantilever 130 hermetically. And the second end of the wire rope passes through the coat 420 and the lifting pipe hermetically in a sliding manner, and is put in the cantilever 130, and then is connected with the moving piece 210 of the execution part 200.

The inlet of the head shower 140 is communicated with the cantilever, and the head shower 140 is provided with an inlet cavity 141 communicated with the inlet, a sliding hole 142 communicated with the inlet cavity 141 and two outlet terminals 143, 144, the outlet 112 is communicated with the sliding hole 142 and the outlet terminal 143, the outlet 113 is communicated with the sliding hole 142 and the outlet terminal 144, and the outlet 112 and 113 is alternately arranged along the axis of the sliding hole 142.

The execution part 200 comprises a moving piece 210, and a seal cover 213 is sleeved out of the moving piece 210, and a middle hole 214 communicated with the inlet cavity 141 is arranged in the moving piece 210, and the seal cover 213 is coupling with the sliding hole 142. And the moving piece 210 can be connected in the sliding hole 142 in a sliding manner, and then:

The seal cover 213 is at the outlet 112, and the seal cover 213 seals the outlet 112, the outlet terminal 143 is sealed with no water coming out; water in the outlet cavity flows into the part of the sliding hole that is at the lower part of the seal cover 213 through the middle hole 214, and then flows into the outlet 113, and then flows out of the outlet terminal 144;

The seal cover 213 is at the outlet 113, and the seal cover 213 seals the outlet 113, the outlet terminal 144 is sealed with no water coming out; water in the outlet cavity flows into the outlet 112 directly through the sliding hole 142, and then flows out of the outlet terminal 143;

The seal cover 213 is between the outlet 112 and the outlet 113, water in the outlet cavity flows into the outlet 112 directly through the sliding hole 142, and then flows out of the outlet terminal 143, and water in the outlet cavity flows into the part of the sliding hole that is at the lower part of the seal cover 213 through the middle hole 214, and then flows into the outlet 113, and then flows out of the outlet terminal 144.

For ensuring that the execution part 200 can execute accurately and circularly, it is better that a return spring 230 is arranged to the execution part 200. And the return spring 230 is arranged between the shower and the moving piece.

Figure 23:
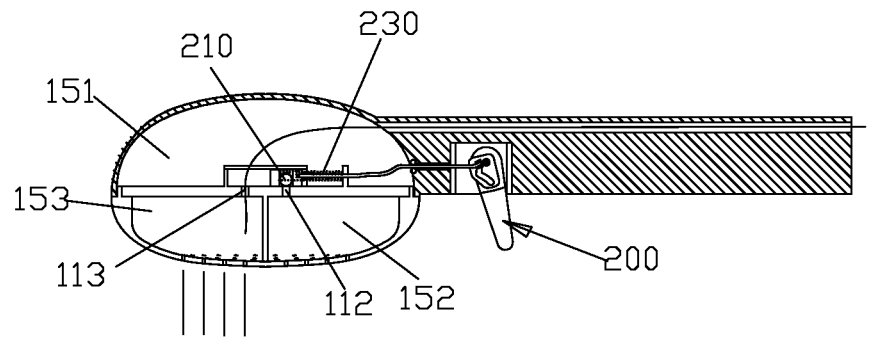
FIG. 23 shows the first sectional view of the waterway device in the embodiment 3, water comes out of one outlet at this moment.
Figure 24:
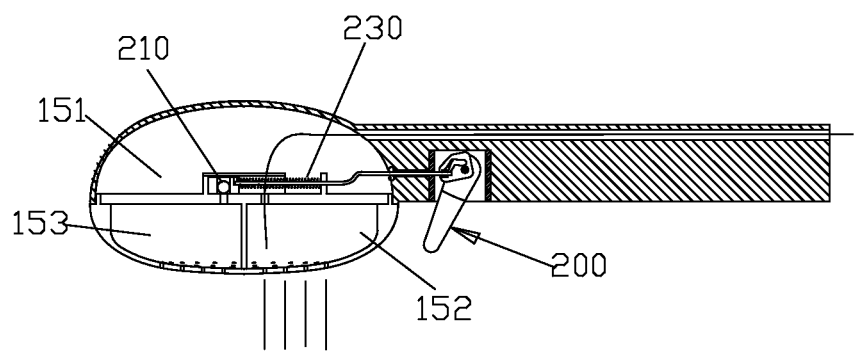
FIG. 24 shows the second sectional view of the waterway device in the embodiment 3, water comes out of two outlets at this moment.
Figure 25:
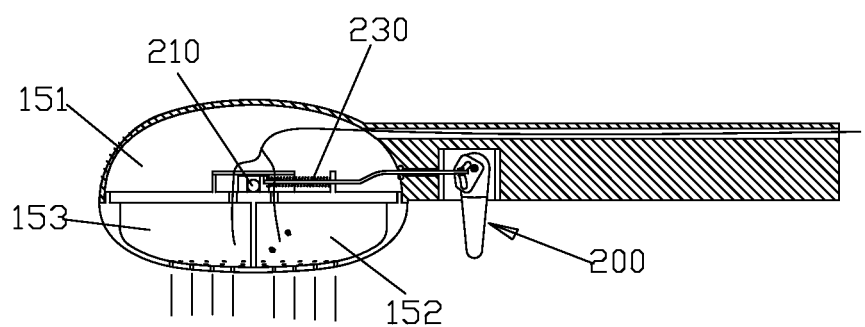
FIG. 25 shows the third sectional view of the waterway device in the embodiment 3, water comes out of another outlet at this moment.

Embodiment 3, the differences from the embodiment 2 are:

According to FIGS. 23, 24 and 25, the main body is a handheld shower, which is provided with an inlet cavity 151 communicated with the inlet and two outlet terminals 152, 153, the outlet 112 is communicated with the inlet cavity 151 and the outlet terminal 152, the outlet 113 is communicated with the inlet cavity 151 and the outlet terminal 153, and the outlet 112 and the outlet 113 are alternately arranged along horizontal direction. And the operation part is mounted to the handheld shower.

The moving piece 210 is connected with the inlet cavity 151 horizontally in a sliding manner, and then:

The moving piece 210 is at the outlet 112, and then the moving piece 210 seals the outlet 112, and then no water flows out of the outlet terminal 152; water in the outlet cavity flows out of the outlet terminal 153 through the outlet 113;

The moving piece 210 is at the outlet 113, and then the moving piece 210 seals the outlet 113, and then no water flows out of the outlet terminal 153; water in the outlet cavity flows out of the outlet terminal 152 through the outlet 112;

The moving piece 210 is between the outlet 112 and the outlet 113, and then water in the outlet cavity flows out of the outlet terminal 152 and the outlet terminal 153 through the outlet 112 and the outlet 113.

For ensuring that the execution part 200 can execute accurately and circularly, it is better that a return spring 230 is arranged to the execution part 200.

Embodiment 4, the differences from the embodiment 1 are:

According to FIGS. 26, 27, 28 and 29, the difference of the operation part 700 from that in the embodiment 1 is that the operation part is a push-pull rod, a connector 340 is fixed to the front end of the push-pull rod 710, and the push-pull rod 710 is limited in the sliding slot 720. The structure and the principle of other parts of the operation part 700 are basically the same to the embodiment 1.

Figure 27:
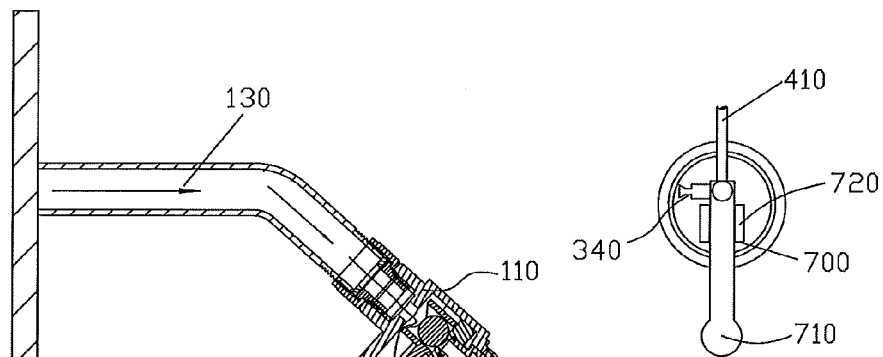
FIG. 27 shows the first abridged general view of the operation part of the waterway device in the embodiment 4.
Figure 28:
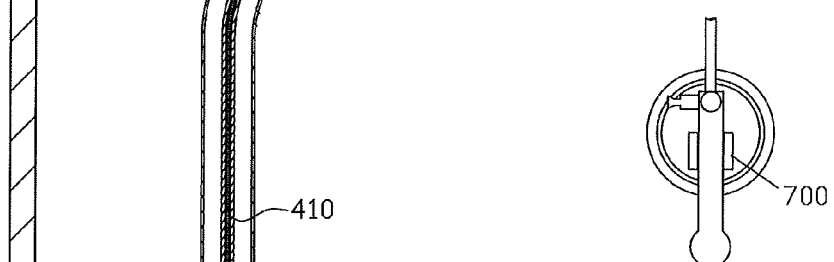
FIG. 28 shows the second abridged general view of the operation part of the waterway device in the embodiment 4.
Figure 26:
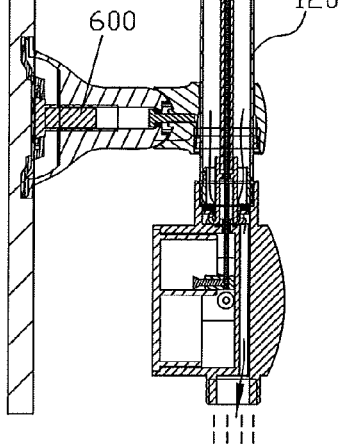
FIG. 26 shows the sectional view of the waterway device in the embodiment 4.
Figure 29:
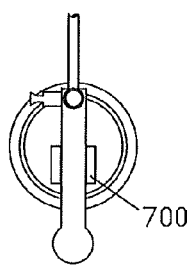
FIG. 29 shows the third abridged general view of the operation part of the waterway device in the embodiment 4.
Figure 30:
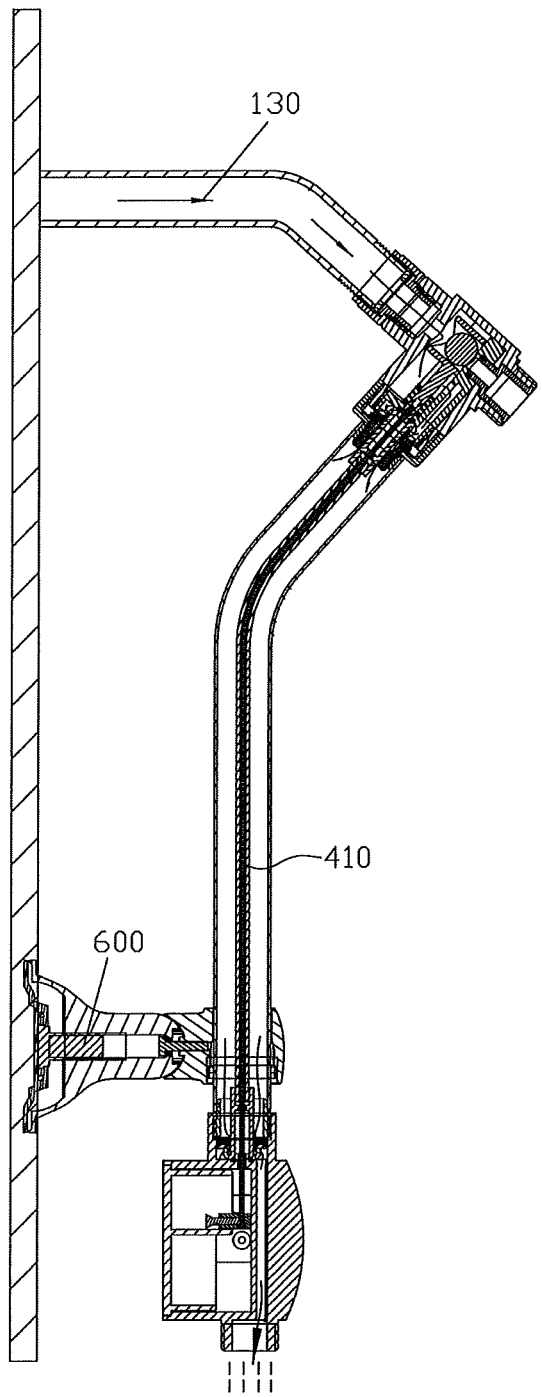
FIG. 30 shows the sectional view of the waterway device in the embodiment 5.

As shown in FIGS. 27, 28 and 29, the push-pull rod 710 can slide up and down in the sliding slot 720, and the wire rope 410 is driven to move through the connector 340, and then the waterway switch is achieved.

Embodiment 5, the differences from the embodiment 1 are:

According to FIGS. 30, 31, 32 and 33, the difference of the operation part 800 from that in the embodiment 1 is that the operation part is a push button, a connector 340 is fixed to the front end of the push button 810, and the push button 810 is limited in the sliding slot 820. The structure and the principle of other parts of the operation part 800 are basically the same to the embodiment 1.

Figure 31:
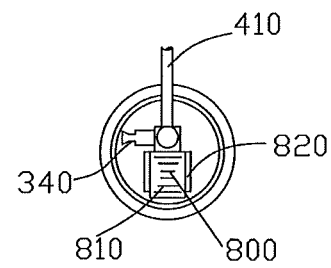
FIG. 31 shows the first abridged general view of the operation part of the waterway device in the embodiment 5.
Figure 32:
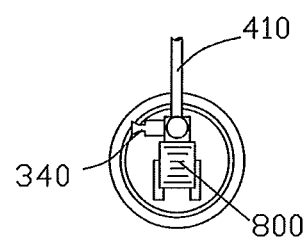
FIG. 32 shows the second abridged general view of the operation part of the waterway device in the embodiment 5.
Figure 33:
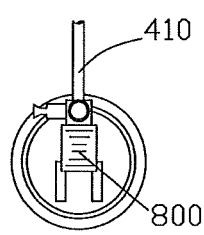
FIG. 33 shows the third abridged general view of the operation part of the waterway device in the embodiment 5.

As shown in FIGS. 31, 32 and 33, the push button 810 can slide up and down in the sliding slot 820, and the wire rope 410 is driven to move through the connector 340, and then the waterway switch is achieved.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

In the waterway switch device in the present invention, the wire rope is driven to move through operating the handle or the push rod, and then the moving piece is driven to move relative to the main body, and then waterway switch is achieved, and the following consequences are generated: the execution part is arranged on the main body, the handle of the operation part can be arranged on the main body or other positions besides the main body, such as the lower end of the lifting pipe, the operation part can be arranged at a convenient position, no matter where the main body is arranged, the users can always operate handily.

What is claimed is:
1. A waterway switch device, comprising:
a waterway mechanism having:
    a main body, an inlet and a plurality of outlets being arranged on the main body; and
    a lifting pipe fixed to the main body;
an execution part mounted in the main body and including a moving piece that is movable relative to the main body to switch the respective outlets to the inlet;
an operation part mounted to the lifting pipe, and including a handle that is rotatable relative to the lifting pipe; and
a transmission part, that includes a wire rope, at least a part of the wire rope being in the lifting pipe, one end of the wire rope being connected with the moving piece, another end of the wire rope being connected with the handle, wherein when the handle is rotated, the wire rope is moved relative to the waterway mechanism, and the moving piece is moved relative to the main body.

2. A waterway switch device according to claim 1, wherein the main body comprises a three-way valve, and the lifting pipe is fixed to the three-way valve and communicates with the outlets.

3. A waterway switch device according to claim 2, wherein the transmission part also comprises a coat mounted in the lifting pipe, the coat having two ports hermetically connected with the operation part and the execution part respectively, the coat being passed through by the wire rope.

4. A waterway switch device according to claim 3, wherein the operation part further comprises an operation seat, a rotation seat and a connecting piece, the operation seat being mounted to a port of the lifting pipe, the rotation seat being mounted in the operation seat in a rotating manner and being provided with an eccentric guiding slot, the connecting piece being connected with the operation seat in a sliding manner and with the wire rope, the handle connected with the operation seat in a rotating manner and with the rotation seat synchronously and coaxially in a rotating manner, a pin being fixed to the connecting piece, the pin being connected with the guiding slot in a coupling manner.

5. A waterway switch device according to claim 2, wherein the operation part further comprises an operation seat, a rotation seat and a connecting piece, the operation seat being mounted to a port of the lifting pipe, the rotation seat being mounted in the operation seat in a rotating manner and being provided with an eccentric guiding slot, the connecting piece being connected with the operation seat in a sliding manner and with the wire rope, the handle being connected with the operation seat in a rotating manner and with the rotation seat synchronously and coaxially in a rotating manner, a pin being fixed to the connecting piece, the pin being connected with the guiding slot in a coupling manner.

6. A waterway switch device according to claim 5, wherein a plurality of locating grooves is concavely arranged out of the operation seat, and an against spring is connected with the handle, an end of the against spring being connected with a locating pin, the locating pin being spliced into one of the locating grooves in a coupling manner.

7. A waterway switch device according to claim 2, wherein the operation part further comprises an operation seat, a rotation seat and a connecting piece, the operation seat being mounted to a port of the lifting pipe and being provided with a lower waterway in communication with the lifting pipe, the rotation seat being mounted in the operation seat in a rotating manner and being provided with an eccentric guiding slot, the connecting piece being connected with the operation seat in a sliding manner and with the wire rope, the handle being connected with the operation seat in a rotating manner and with the rotation seat synchronously and coaxially in a rotating manner, a pin being fixed to the connecting piece, the pin being connected with the guiding slot in a coupling manner.

8. A waterway switch device according to claim 1, wherein the main body comprises a cantilever and a shower in communication with the cantilever, the lifting pipe being fixed to the cantilever, and the outlets being arranged on the shower, and the execution part being arranged in the shower, and the outlets of the shower being can be switched through the handle.

9. A waterway switch device according to claim 8, wherein the transmission part also comprises a coat mounted in the lifting pipe, the coat having two ports connected with the operation part and the cantilever, respectively, the one end of the wire rope passing through the coat and into the cantilever hermetically, and being connected with the execution part.

10. A waterway switch device according to claim 1, wherein the operation part is mounted to the main body, and the handle is rotatable relative to the main body, and the wire rope is in the main body.

11. A waterway switch device, comprising:
 a waterway mechanism
  a main body having a three-way valve, an inlet and a plurality of outlets being arranged on the main body; and
  a lifting pipe fixed to the three-way valve and communicating with the outlets;
 an execution part mounted in main body and including a moving piece that is movable relative to the main body to switch the outlets to the inlet;
 an operation part mounted to the lifting pipe, and including a push-pull rod that is slidable relative to the lifting pipe; and
 a transmission part that includes a wire rope, at least a part of the wire rope being in the lifting pipe, one end of the wire rope being connected with the moving piece, another end of the wire rope being connected with the push-pull rod, wherein when the push-pull rod is slid, the wire rope is moved relative to the waterway mechanism, and the moving piece is moved relative to the main body.

12. A waterway switch device, comprising:
 a waterway mechanism
  a main body having a three-way valve, an inlet and a plurality of outlets being arranged on the main body; and
  a lifting pipe fixed to the three-way valve and communicating with the outlets;
 an execution part mounted in the main body and including a moving piece that is movable relative to the main body to switch the outlets to the inlet;
 an operation part mounted to the lifting pipe, and including a push button that is slidable relative to the lifting pipe; and
 a transmission part that includes a wire rope, at least apart of the wire rope being in the pipe, one end of the wire rope being connected with the moving piece, another end of the wire rope being connected with the push button, wherein when the push button is slid, the wire rope is moved relative to the waterway mechanism, and the moving piece is moved relative to the main body.

\* \* \* \* \*